United States Patent [19]
Smith et al.

[11] Patent Number: 5,382,044
[45] Date of Patent: Jan. 17, 1995

[54] MOUNTING STRUCTURE OF A FRONT SUSPENSION SYSTEM

[75] Inventors: Robert H. Smith, Troy; Jan Szadkowski, Rochester Hills, both of Mich.

[73] Assignee: Chrysler Corporation, Highland Park, Mich.

[21] Appl. No.: 103,617

[22] Filed: Sep. 30, 1993

Related U.S. Application Data

[62] Division of Ser. No. 992,372, Dec. 17, 1992.

[51] Int. Cl.⁶ .............................................. B60G 3/06
[52] U.S. Cl. ................................. 280/673; 280/660; 280/690; 280/691; 280/788
[58] Field of Search ................. 280/690, 96.1, 660, 280/673, 688, 651, 788

[56] References Cited

U.S. PATENT DOCUMENTS

| | | | |
|---|---|---|---|
| 4,240,517 | 12/1980 | Harlow, Jr. et al. | 180/295 |
| 4,341,397 | 7/1982 | Morimura et al. | 280/688 |
| 4,377,298 | 3/1983 | Finn et al. | 280/663 |
| 4,458,913 | 7/1984 | Rumpel | 280/690 |
| 4,583,759 | 4/1986 | Kami et al. | 280/673 |
| 4,750,755 | 6/1988 | Hayashi et al. | 280/668 |
| 4,810,002 | 3/1989 | Kakimoto et al. | 280/666 |
| 4,813,704 | 3/1989 | Smith | 280/692 |
| 4,874,185 | 10/1989 | Kijima | 280/690 |
| 4,875,703 | 10/1989 | Murakami | 280/665 |
| 4,957,307 | 9/1990 | Gandiglio | 280/690 |
| 5,087,074 | 2/1992 | Komatsu et al. | 280/788 |
| 5,087,229 | 2/1992 | Hewko et al. | 475/149 |
| 5,183,286 | 2/1993 | Ayabe | 280/688 |

FOREIGN PATENT DOCUMENTS

| | | | |
|---|---|---|---|
| 402777 | 12/1990 | European Pat. Off. | 280/96.1 |
| 2-24211 | 1/1990 | Japan | 280/688 |
| 4-215565 | 8/1992 | Japan | 280/788 |
| 1162664 | 6/1985 | U.S.S.R. | 280/788 |

*Primary Examiner*—Eric D. Culbreth
*Attorney, Agent, or Firm*—Edward P. Barthel

[57] ABSTRACT

A mounting structure for mounting to a vehicle body having oppositely disposed strut towers. The mounting structure includes right and left suspension assemblies, a cradle operatively connected therebetween, a vehicle engine and transmission mounted on the cradle and guide pins provided on each of the suspension assemblies. The mounting structure is adapted to being mounted as a unit into the vehicle body with the guide pins guiding the suspension assemblies into engagement with the respective oppositely disposed strut towers, and suitable fasteners for securing the suspension assemblies to the strut towers. Each strut tower includes outer and inner interconnected, spaced apart wall members separated by support spacers, with a plurality of aligned openings formed through the outer and inner spaced apart wall members, a pair of guide openings formed in the inner wall member, and an opening formed through the outer and inner wall members' central portion. The suspension system includes a wishbone-shaped upper control arm pivotally connected at its opposite ends to the bushings, an A-shaped lower control arm pivotally connected at its opposite ends to the cradle, and a cast metal bracket operatively connected to the upper control arm, with the guide pins formed thereon and the fasteners secured thereto.

5 Claims, 6 Drawing Sheets

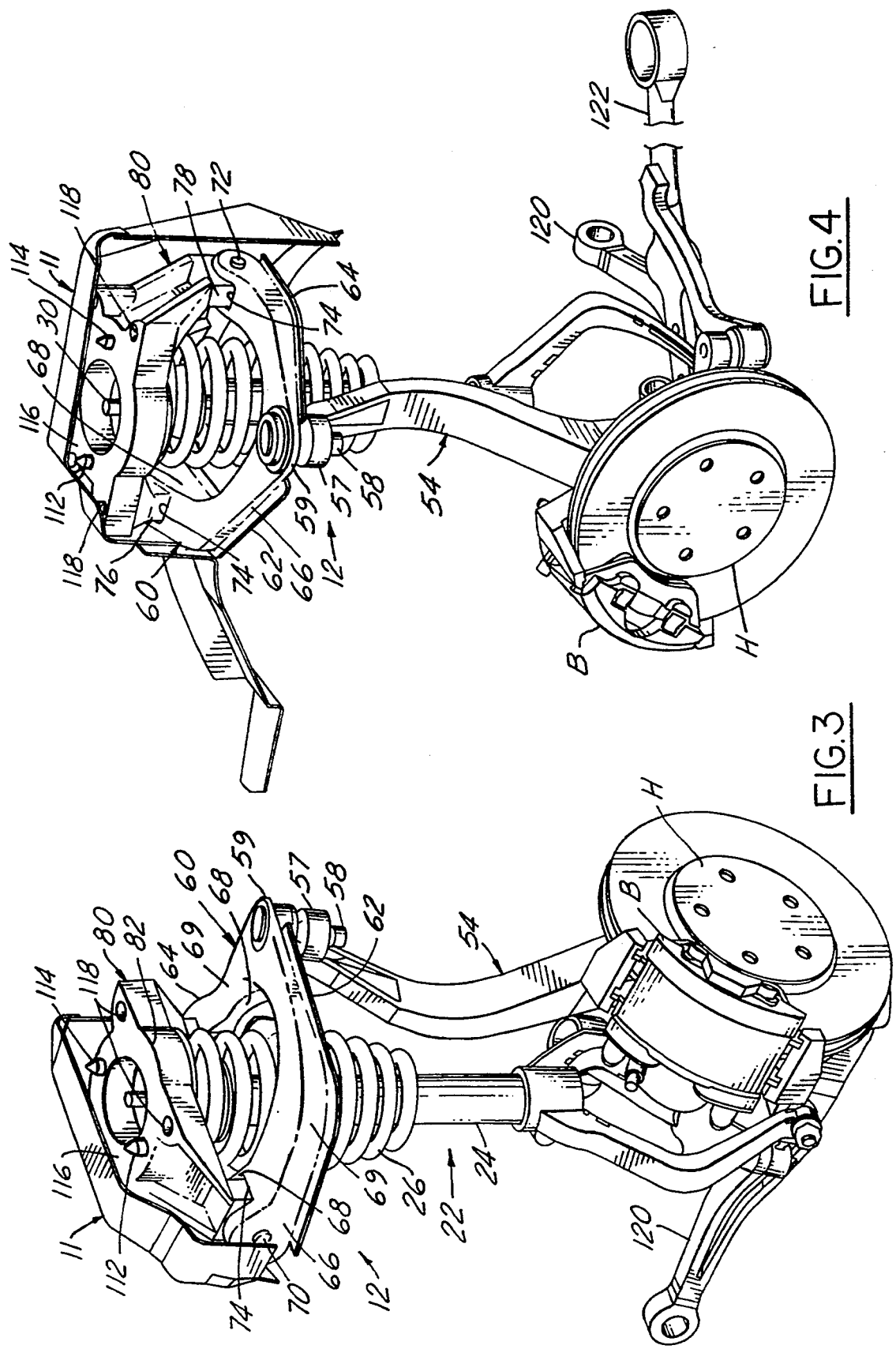

MOUNTING STRUCTURE OF A FRONT SUSPENSION SYSTEM

This is a division of application Ser. No. 07/992,372, filed on Dec. 17, 1992, pending.

FIELD OF THE INVENTION

This invention relates generally to a mounting structure for a front suspension system and, more particularly, to a mounting structure for joining to a vehicle body both the right and left suspension shocks, springs, control arms, and a cradle therebetween supporting an engine and transmission.

BACKGROUND ART

Heretofore, vehicle suspension systems have generally either been assembled onto the vehicle in various parts, or individual right and left assemblies have been pre-assembled and then mounted as individual assemblies onto a vehicle body. Examples of such arrangements are Kami et al U.S. Pat. No. 4,583,759, Kakimoto et al U.S. Pat. No. 4,810,002, Murakami U.S. Pat. No. 4,875,703, Smith U.S. Pat. No. 4,813,704, Hewko et al U.S. Pat. No. 5,087,229, Komatsu et al U.S. Pat. No. 5,087,074, Finn U.S. Pat. No. 4,377,298. Of these, the Hewko et al and Finn arrangements are attached both to a strut tower and a frame element. The strut tower of Hewko et al includes three interconnected, spaced apart wall members.

Hayashi et al U.S. Pat. No. 4,750,755 discloses a mounting structure for mounting a suspension on a vehicle body, including a sheet metal bracket having bolts for securing the bracket to the body.

Harlow et al U.S. Pat. No. 4,240,517 discloses a front wheel drive vehicle having a cradle that is cushion mounted on the vehicle body, with the engine, transmission, and differential cushion mounted on the cradle.

DISCLOSURE OF THE INVENTION

A general object of the invention is to provide an improved mounting structure for mounting both right and left suspension assemblies as a unit to the vehicle body.

Another object of the invention is to provide such an improved mounting structure wherein the vehicle engine and transmission are mounted on a cross structure between the right and left suspension assemblies, adaptable to being mounted in the vehicle as part of the unit being mounted.

A further object of the invention is to provide a mounting structure for mounting the right and left suspension assemblies as a unit to the vehicle body, wherein each suspension assembly includes a rigid bracket at the upper end thereof, having a pair of locating pins and a plurality of fastening means for mounting to a tower having outer and inner wall members.

Other objects and advantages will become more apparent when reference is made to the following drawings and accompanying description.

BRIEF DESCRIPTION OF THE DRAWINGS

FIGS. 3 and 4 are front and rear perspective views, respectively, of the FIG. 2 structure;

BEST MODE OF CARRYING OUT THE INVENTION

Figure 1:
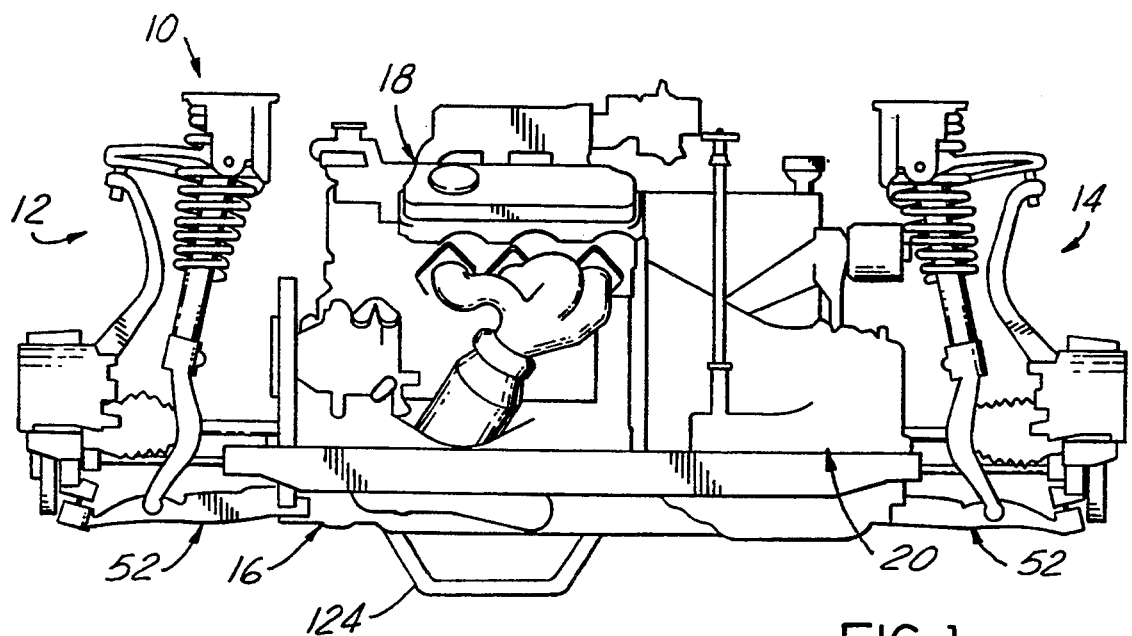
FIG. 1 is a rear end view of the overall mounting structure, including right and left front suspension systems, and an intermediate cradle supporting an engine and a transmission, adaptable to being mounted as a unit in a vehicle.

Referring now to the drawings in greater detail, the Figure illustrates a mounting structure 10 (FIG. 1) adaptable to being mounted against the front strut towers 11 (FIGS. 3, 4, 6 and 8) of a vehicle body. The mounting structure 10 includes left and right suspension systems 12 and 14, respectively, with a cradle 16 (FIG. 1) connected therebetween. An engine 18 and an operatively interconnected transmission 20 are mounted on the cradle 16.

Each left and right suspension system 12 and 14 includes a shock absorber 22 including a shock tube 24 having a coil spring 26 mounted therearound, a piston.28 (FIG. 6) slidably extending upwardly therefrom and terminating in a threaded end 30.

A clevis 32 includes a split collar 34 (FIG. 6) and a pair of legs 36 and 38 extending downwardly from oppositely disposed sides of the collar. A threaded fastener 40 is mounted through threaded openings 42 and 44 formed on opposite sides of the split 46 in the split collar 34. The fastener 40 serves to tighten the split collar 34 around the lower end of the shock tube 24. A pair of aligned openings 48 and 50 are formed through the distal ends of the legs 36 and 38, respectively.

Figure 1A:
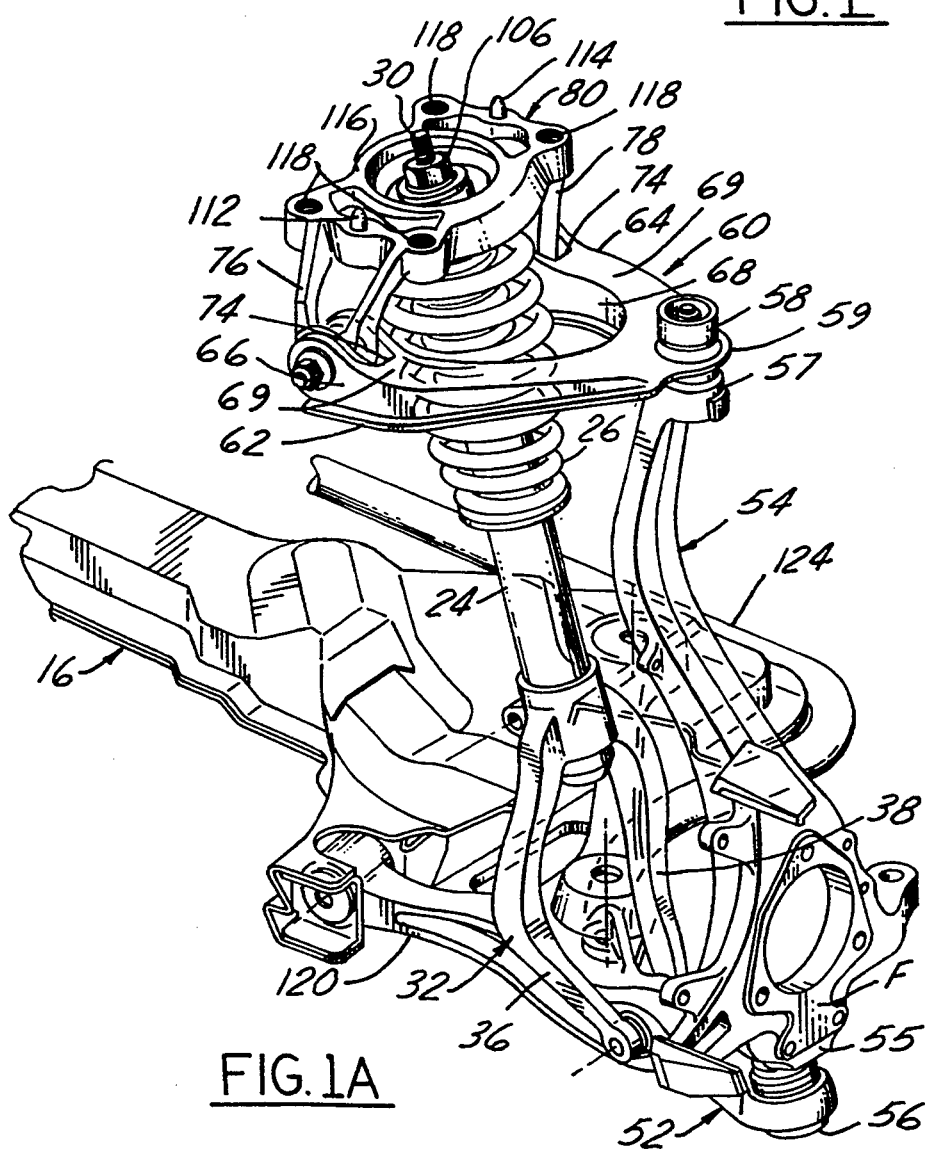
FIG. 1A is an enlarged perspective view of a portion of the left side of FIG. 1.
Figures 2, 7:
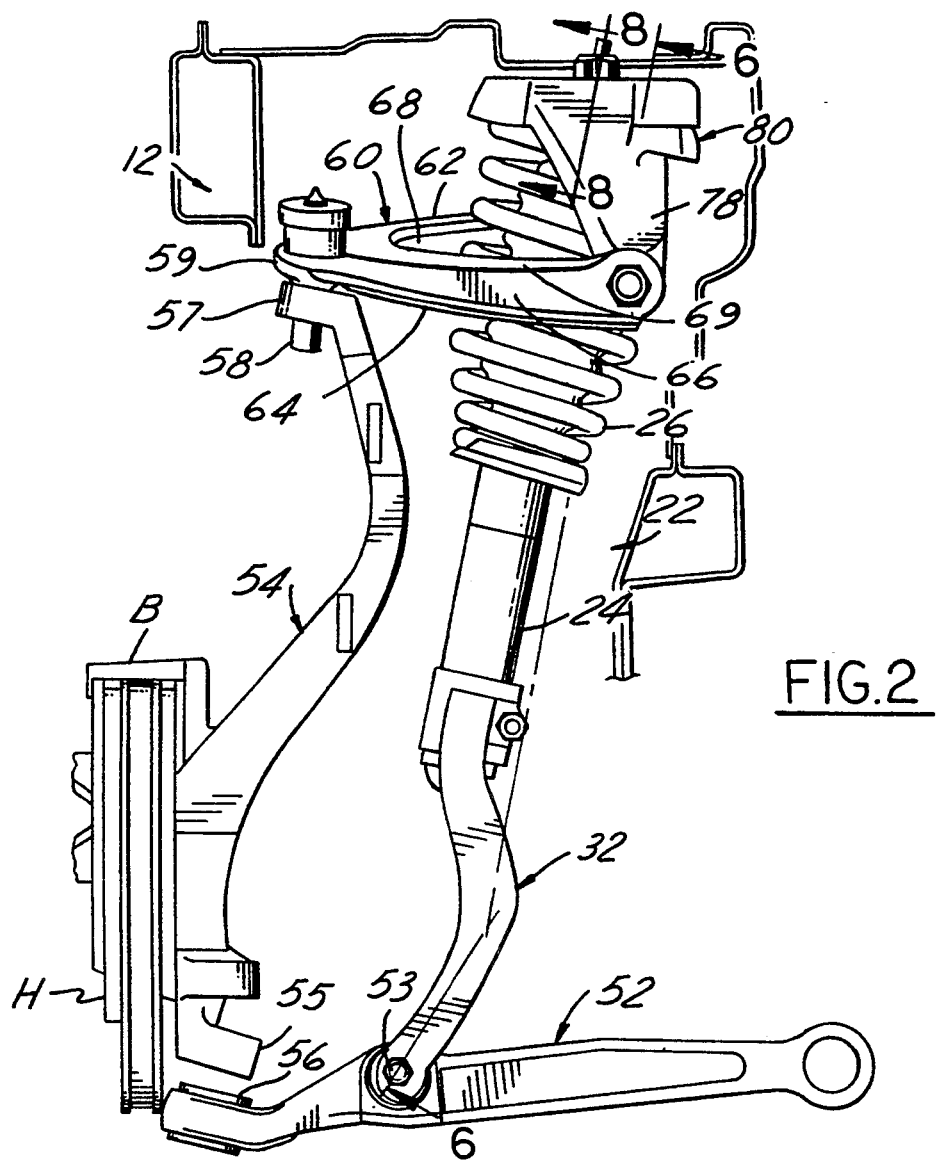
FIG. 2 is an enlarged end view of the left front suspension system of the FIG. 1 structure.
FIG. 7 is an enlarged perspective view of a cast metal bracket portion of FIG. 2.
Figure 5:
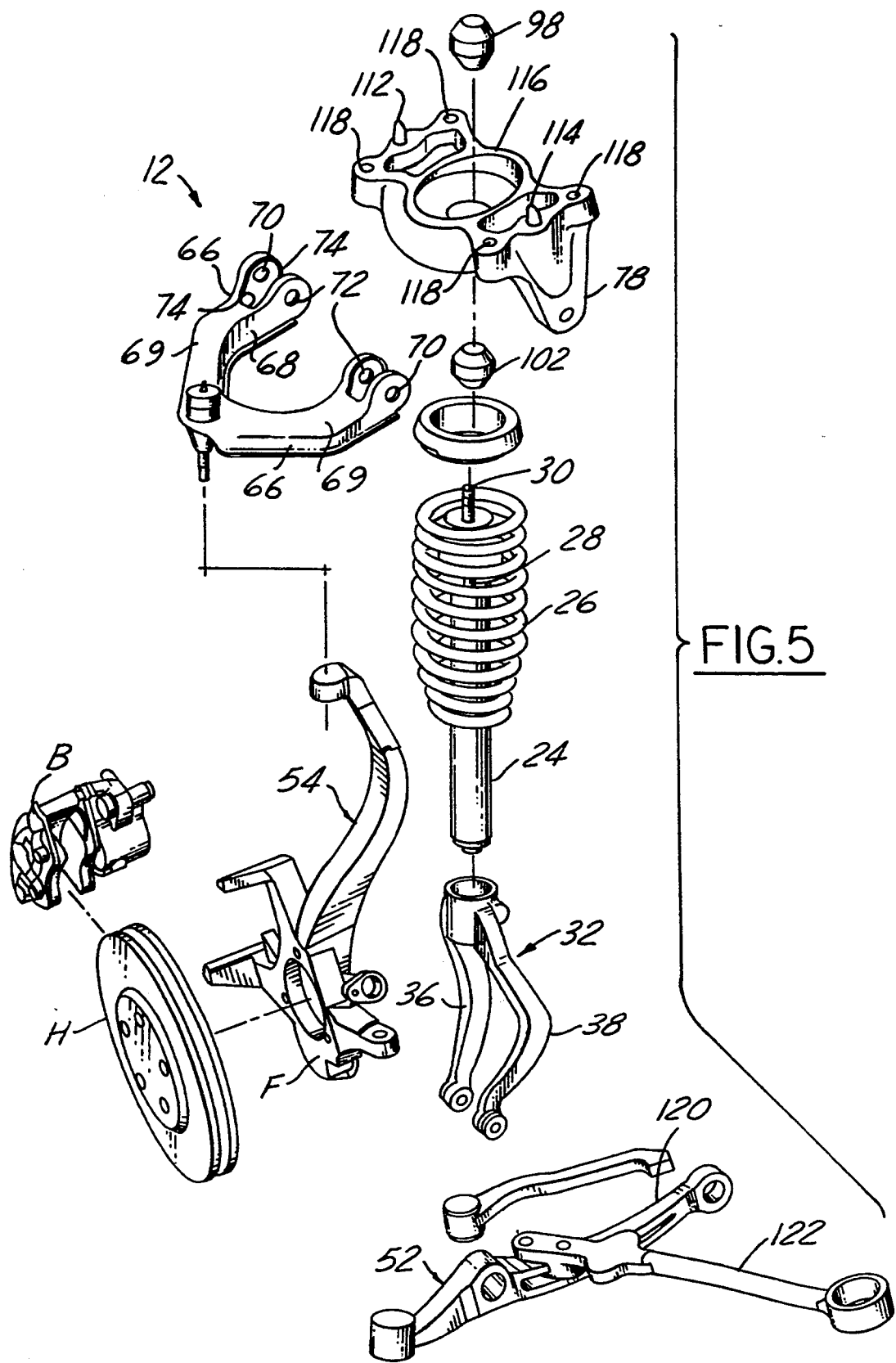
FIG. 5 is an exploded perspective view of the FIG. 2 structure.

The ends of the legs 36 and 38 straddle and are pivotally connected to opposite sides of a mid portion of an A-shaped lower control arm 52 (FIGS. 2 and 5) by suitable pivot pins 53 (FIG. 2). A steering knuckle 54 includes a lower end portion 55 (FIGS. 1A and 2) secured by a suitable fastener 56 (FIG. 1A) to the outer end of the lower control arm 52. The upper end portion 57 of the steering knuckle 54 is pivotally connected by a suitable fastener 58 to a central portion 59 of a wishbone-shaped upper control arm 60. A wheel mounting hub H (FIGS. 2–4) and brake device B are mounted on a face F (FIG. 1A) of the steering knuckle 54.

The upper control arm 60 includes legs 62 and 64, each leg being formed longitudinally in an inverted U-shape, having respective outer and inner flanges or walls 66 and 68 (FIGS. 3 and 4), respectively, extending downwardly from a top wall 69. The inner flanges 68 straddle the coil spring 26 and aligned openings 70 and 72 (FIG. 5) are formed through the respective distal ends of each set of outer and inner flanges. A cut-out 74 is formed in the end of each leg intermediate the outer and inner flanges. The cut-outs 74 straddle downwardly extending legs 76 and 78 (FIGS. 2–4 and 7) of a rigid cast metal bracket 80 having a round central body portion 82.

An opening 84 (FIG. 6) is formed through each leg 76 and 78 A bushing 86, including a central metal sleeve 88 surrounded by a rubber cylinder 90, is mounted through each opening 84. A bolt 92 extended through each inner flange 68, the metal sleeve 88, and the outer flange 66, is secured by a nut 94 pivotally retain the upper control arm legs 62 and 64 on the bracket legs 76 and 78.

A central aperture 96 and adjacent upper and lower annular recesses 97 (FIG. 6) are formed through the central body portion 82. A bushing 98 includes a central metal sleeve 100 surrounded by rubber 102 confined in the recesses 97 and having an annular recess fixedly mounted within the outer peripheral edge of the central aperture 96. A larger annular recess 104 (FIG. 6) is formed in the lower surface of the central body portion 82 concentric with the axis of the central aperture 96.

Figure 6:
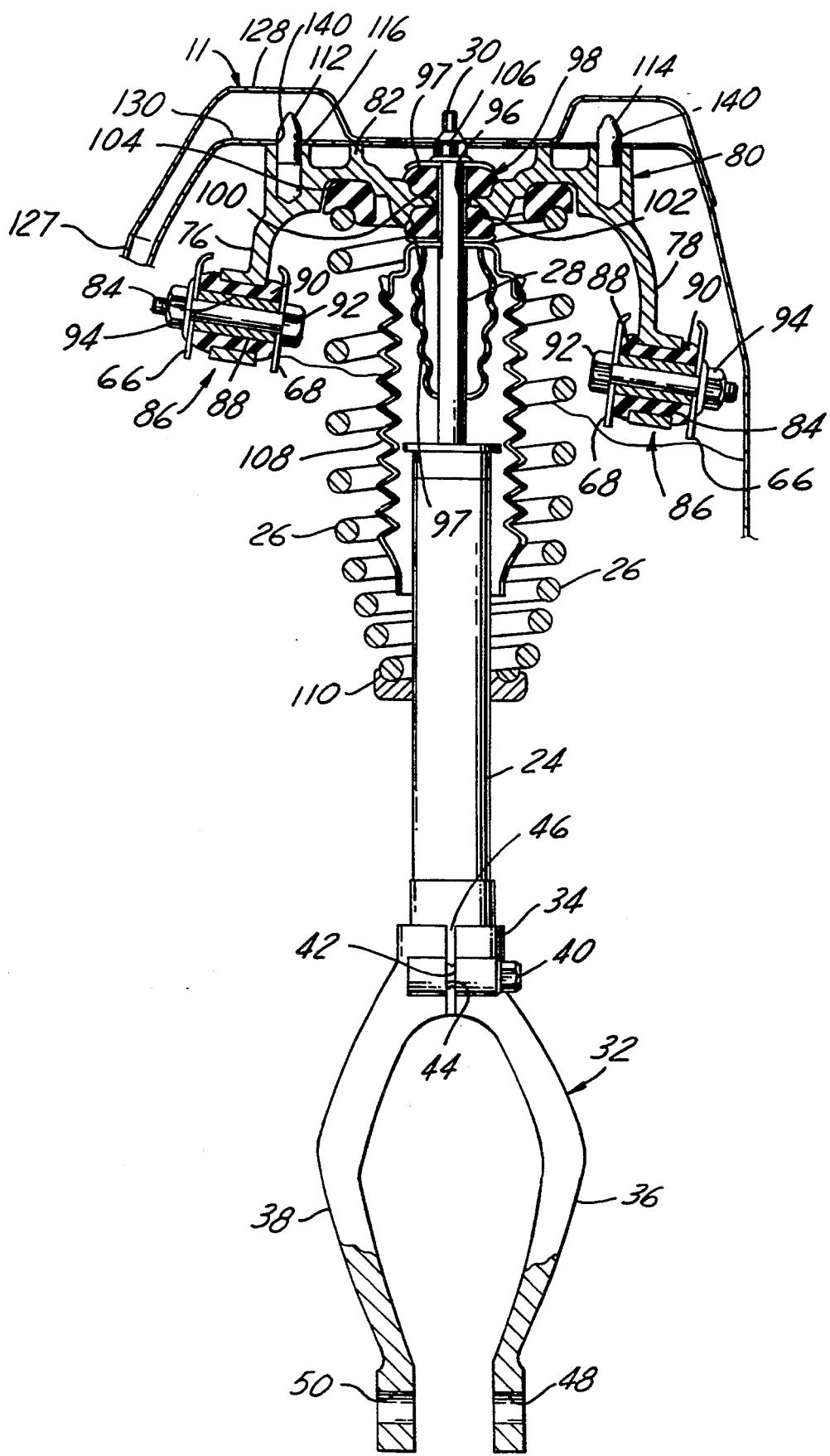
FIG. 6 is a cross-sectional view taken along the plane of the line 6—6 of FIG. 2, and looking in the direction of the arrows.

As shown most clearly in FIG. 6, the piston 28 is extended through the metal sleeve 100, with a nut 106 mounted on the threaded end 30 against the upper end of the bushing 98. A collapsible rubber sleeve 108 is mounted around the piston 28, between the lower end of the bushing 98 and an upper portion of the shock tube 24, to keep the piston 28 clean. The coil spring 26 is mounted between the annular recess 104 and a mount 110 secured around the shock tube 24.

A pair of pointed guide pins 112 and 114 (FIGS. 5-7) are fixedly secured at opposite ends of a top machined surface 116 of the bracket 80. Four threaded openings 118 (FIGS. 3-7) are formed adjacent the four corners of the bracket 80 in the surface 116.

Each lower control arm 52 includes legs 120 and 122 adapted to be connected at their ends to a side of the cradle 16. The vehicle engine 18 and the transmission 20 are mounted on the cradle 16. An anti-sway bar 124 (FIGS. 1 and 1A) is connected at two mid-points thereof to the respective rear corners of the cradle 16, and at its distal ends to the under surfaces of right and left steering knuckles 54.

Figure 8:
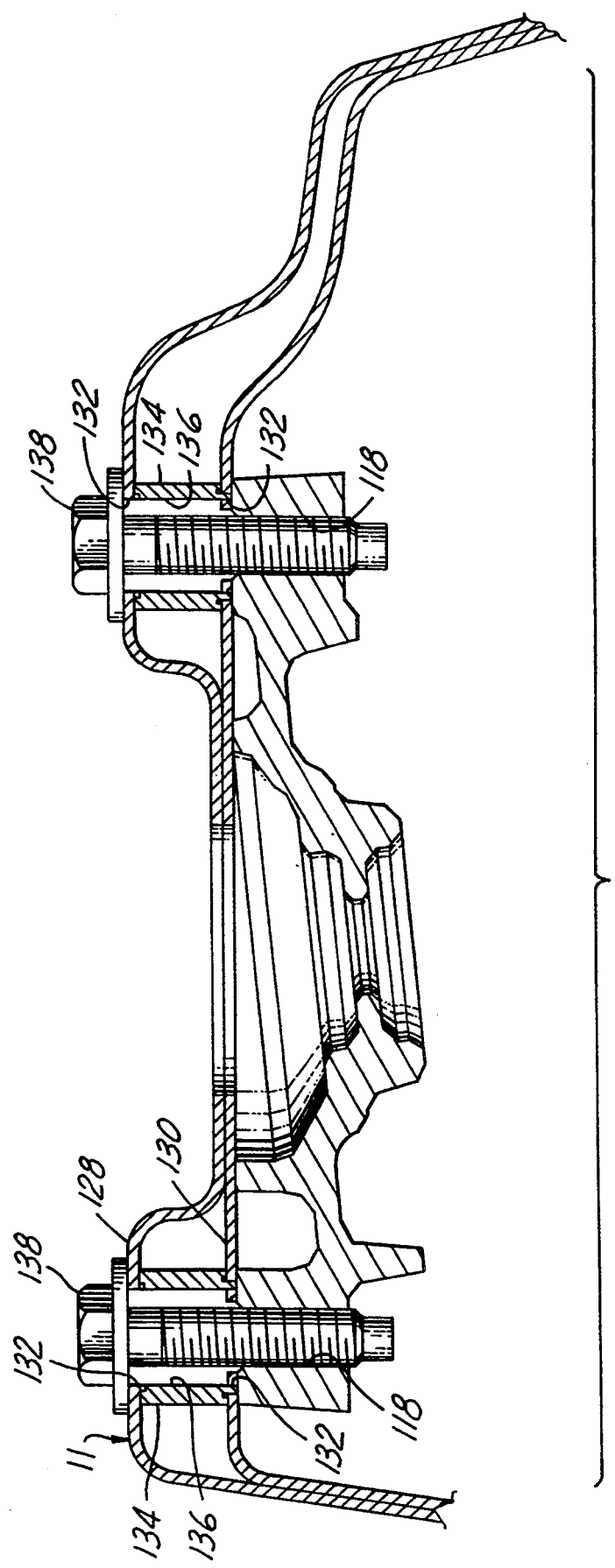
FIG. 8 is a cross-sectional view taken along the plane of the line 8—8 of FIG. 2, and looking in the direction of the arrows.

Referring now to FIGS. 6 and 8, the vehicle's oppositely disposed strut towers 11 are connected at a rear lower end thereof to a side rail not shown of the vehicle, and at a forward end thereof to a vehicle load beam, represented at 127. Each strut tower 11 includes outer and inner interconnected, spaced apart sheet metal wall members 128 and 130. Four pairs of aligned openings 132 are formed through the outer and inner wall members 128 and 130, positioned so as to align with the four threaded openings 118 in the bracket 80. Metal cylindrical support spacers 134 (FIG. 8) are confined between the outer and inner wall members 128 and 130, with an inside diameter 136 thereof aligned with the diameter of the openings 132. Four bolts 138 are extended through the openings 132 and the inside diameter 136 to become threadedly connected to the four threaded openings 118 in the bracket 80. A pair of openings 140 (FIG. 6) are formed in the inner wall member 130, positioned so as to align with and receive the guide pins 112 and 114.

In production, the left and right suspension systems 12 and 14, the cradle 16, the engine 18, the transmission 20, the anti-sway bar 124, and the wheel mounting hub H are pre-assembled as a mounting structure 10. The complete structure 10 is raised as a unit into the vehicle, with the guide pins 112 and 114 serving to enter the openings 140 in the inner wall member 130. Once in place, the four bolts 138 are inserted and secured as described above, and the cradle 16 is secured to side frame members (not shown) of the vehicle, and the usual wheels (not shown) are mounted on the mounting hub H.

Industrial Applicability

It should be apparent that the invention provides an improved mounting structure for mounting as a unit, the left and right suspension systems, and intermediate cradle-supported engine and transmission into the front end of a vehicle, guided into place against left and right strut towers.

It should be further apparent that the invention provides a unique rigid cast metal bracket associated with each suspension system, and adapted to being secured against an inner wall member of a double reinforced wall strut tower.

While but one embodiment of the invention has been shown and described, other modifications thereof are possible within the scope of the following claims.

What is claimed is:

1. A mounting assembly for mounting a suspension assembly to a vehicle body, said mounting assembly comprising a tower secured to the vehicle body and including outer and inner wall members abutting against one another at a central portion thereof and spaced apart at an annular outer portion thereof; a plurality of support spacers confined between said wall members in the spaced apart annular outer portion; a bracket operatively connected to the upper end of said suspension assembly adaptable to abut against said inner wall member; an upper control arm having a pair of ends pivotally connected to said bracket; a plurality of aligned openings formed through said outer wall member, said support spacers, said inner wall member, and into said bracket, said openings in said bracket being threaded; and a plurality of threaded fasteners mounted through said respective aligned openings and threadedly secured in said threaded openings to mount said suspension assembly.

2. The mounting assembly described in claim 1, and a pair of guide openings formed in said inner wall member, and a pair of guide pins provided on said bracket for piloting into said respective guide openings.

3. The mounting assembly described in claim 1, wherein said outer and inner wall members are formed of sheet metal.

4. The mounting assembly described in claim 1, wherein said support spacers are cylindrical in shape concentric with said aligned openings, and formed of metal.

5. The mounting assembly described in claim 1, wherein said bracket is formed of cast metal.

* * * * *